United States Patent
Cheng et al.

[19]

[11] Patent Number: 6,081,583
[45] Date of Patent: Jun. 27, 2000

[54] POST CALL DIRECTORY ENTRY DEVICE AND METHOD

[75] Inventors: Frank S. Cheng, East Brunswick; Randall J. Penning, Middletown, both of N.J.

[73] Assignee: Lucent Technologies Inc., Murray Hill, N.J.

[21] Appl. No.: 08/579,105

[22] Filed: Dec. 27, 1995

[51] Int. Cl.[7] .................................................. H04M 1/64
[52] U.S. Cl. .......................... 379/88.2; 379/142; 379/355
[58] Field of Search .................. 379/67, 88, 89, 379/352, 355, 372, 142, 88.18, 88.19, 88.2, 88.21

[56] References Cited

U.S. PATENT DOCUMENTS

| | | | |
|---|---|---|---|
| 4,924,496 | 5/1990 | Figa et al. ................................. | 379/142 |
| 4,928,302 | 5/1990 | Kaneuchi et al. ......................... | 379/88 |
| 5,297,183 | 3/1994 | Bareis et al. .............................. | 379/88 |
| 5,446,785 | 8/1995 | Hirai ......................................... | 379/67 |
| 5,528,680 | 6/1996 | Kazpicke .................................. | 379/142 |
| 5,568,546 | 10/1996 | Marutiak .................................. | 379/355 |

OTHER PUBLICATIONS

"Your Wildfire Electronic Assistant," Wildfire Communiations, Inc., Lexington, Massachusetts, 1995.

*Primary Examiner*—Fan S. Tsang

[57] ABSTRACT

The invention includes a post call directory entry device that performs the post call directory entry function for a telephone station. The post call directory entry device includes a directory memory, a post call controller and a user interface device that includes a keypad, a microphone and a speaker. The post call controller stores a remote number in the directory memory after the telephone station is on-hook. The save number is stored in the directory memory if the directory memory is not full and if a user responds to a save request output by the post call controller. The save number is one of a dialed number entered by the user using a dialpad portion of the keypad and a remote caller telephone station number. The remote number is determined when the telephone station is off-hook.

18 Claims, 4 Drawing Sheets

POST CALL DIRECTORY ENTRY DEVICE AND METHOD

BACKGROUND OF THE INVENTION

1. Field of the Invention

This invention relates to a device and method for adding an entry in a telephone directory after a call is made either to a telephone station or from the telephone station.

2. Description of Related Art

Conventional telephone stations include directory features capable of storing a plurality of telephone numbers associated with names of parties to be called. Sophisticated telephone stations contain electronic memories capable of storing names and associated telephone numbers. Often, the best time to save a new number is immediately after the call is made by a user. Similarly, when a call is received, the best time to save a caller number is immediately after the call. However, current telephone stations do not provide any support for saving a number into a directory immediately after a call is completed.

SUMMARY OF THE INVENTION

An objective of the invention is to provide a post call directory entry device that performs a post call directory entry function. The post call directory entry device includes a directory memory, a user interface device and a post call controller. The post call controller saves a remote number when the telephone station is off-hook and stores the remote number in the directory memory after the telephone station is on-hook. The post call controller outputs a save request through the user interface device if the directory memory is not full and stores the remote number in the directory memory if a user responds to the output save request through the user interface device. The remote number is one of a user dialed number and a remote caller telephone station number. The remote number is determined when the telephone station is off-hook.

Another objective is to provide a method for performing a post call directory entry function of a telephone station. The method includes determining that the telephone station is off-hook, saving the remote number, determining that the telephone station is on-hook and determining that the directory memory is not full and outputting a save request to the user through a user interface device after the telephone station is on-hook. The save request is not output if the directory memory is full. If the user responded to the save request, the remote number is saved in the directory memory.

BRIEF DESCRIPTION OF THE DRAWINGS

The invention will be described in detail with reference to the following drawings, wherein like numerals represent like elements and.

DETAILED DESCRIPTION OF PREFERRED EMBODIMENTS

Figure 1:
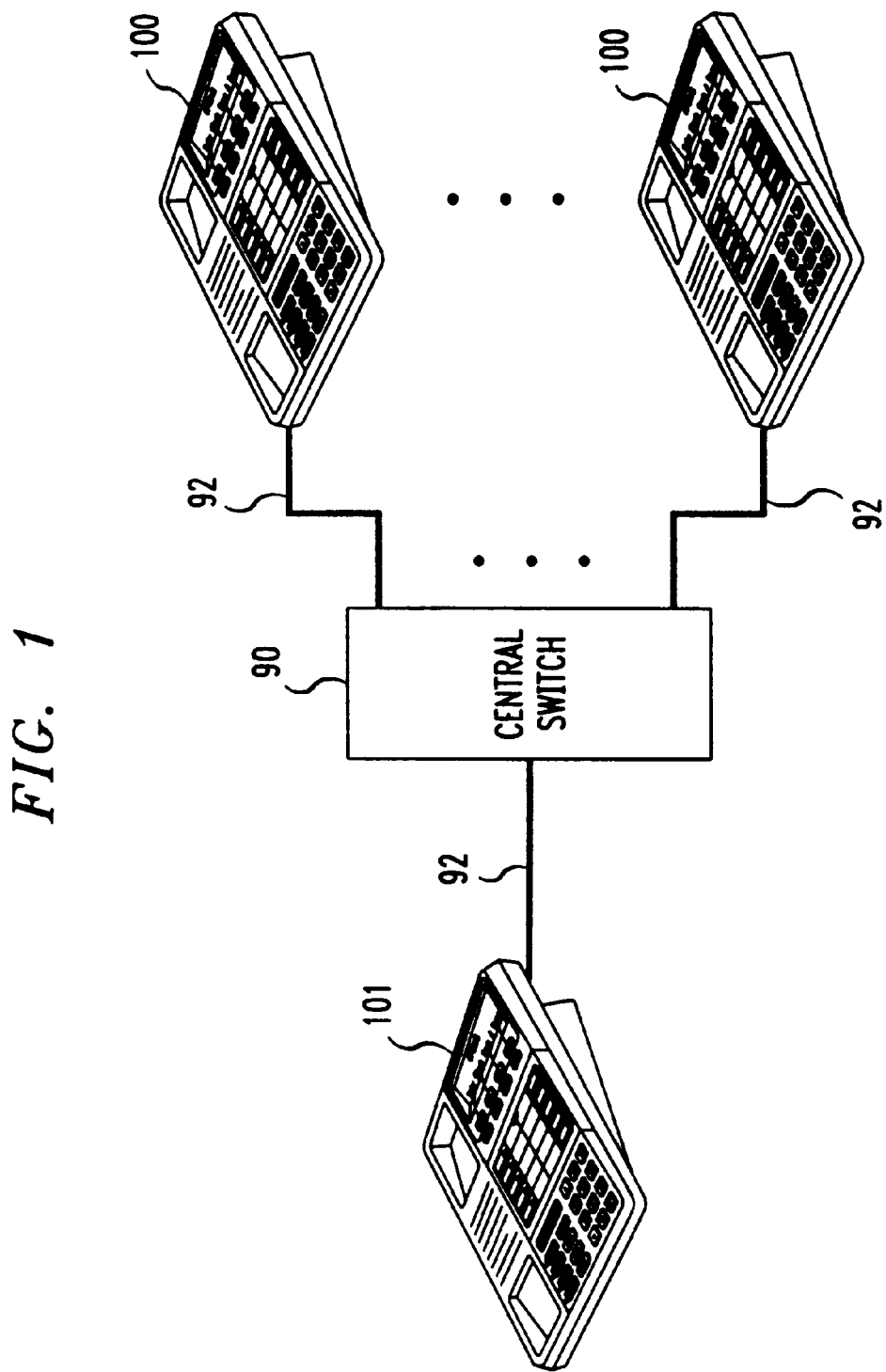
FIG. 1 is a block diagram of a plurality of telephone stations connected to a central switch.

FIG. 1 shows a block diagram including a plurality of telephone stations 100 and a remote telephone station 101 connected through signal lines 92 to a central switch 90, such as a private branch exchange (PBX). The remote telephone station 101 may be connected to another central switch 90 (not shown) and the two central switches 90 are connected together by a network (also not shown). Each of the signal lines 92 includes one bearer channel. The signal lines 92 may also include a signaling channel. The bearer channel carries digital or analog audio and/or application level data while the signaling channel carries inter-processor data. If the telephone station 100 is analog, separate bearer and signaling channels are not required.

Figure 2:
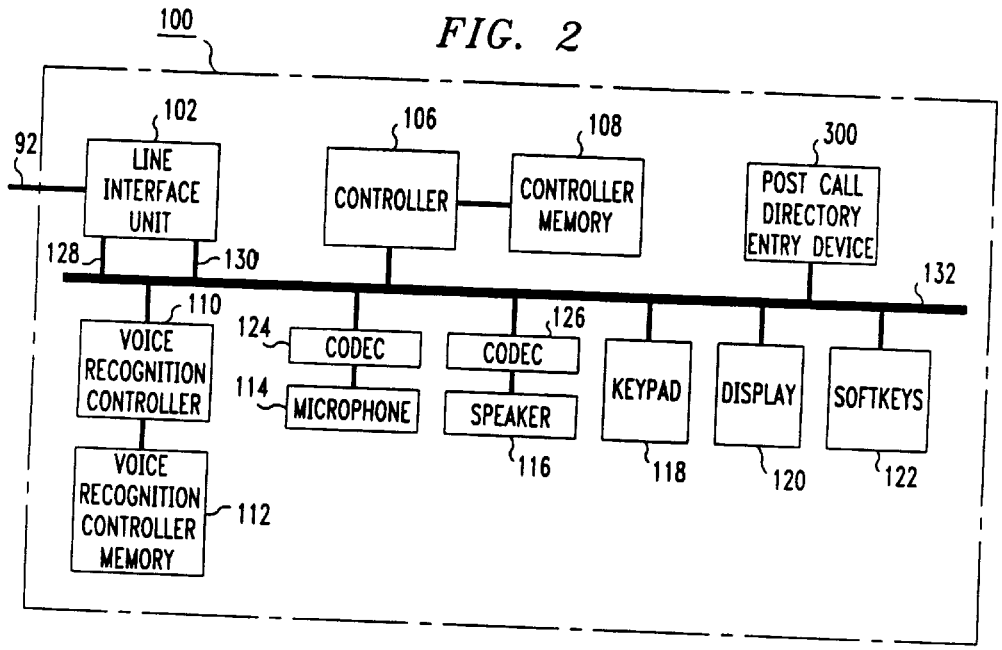
FIG. 2 is a block diagram of the telephone station.

FIG. 2 shows a block diagram of the telephone station 100. The signal line 92 is input to the line interface unit 102. The line interface unit 102 converts the signal line 92 into one or more bearer channels 128 and a signaling channel 130. The signaling channel 130 contains information indicating that a caller has dialed the telephone number associated with the telephone station 100. The telephone station controller 106 scans the data on the signaling channel 130 through signal line 132. The signal line 132 interconnects the components of the telephone station 100 together. When the telephone station controller 106 detects that the telephone station 100 has been called, the telephone station controller 106 activates the telephone ringer (not shown) and when the user takes the telephone station 100 off-hook, the user is connected to the bearer channel 128 of the line interface unit 102 for conventional audio communication.

The voice recognition controller 110 connected to the signal line 132 also scans the signaling channel 130. When the voice recognition controller 110 detects special codes on the signaling channel 130, it accesses the bearer channel 128 and communicates with the external caller by outputting audio voice data and receiving audio voice commands from the caller.

Since the voice recognition controller 110 and the telephone station controller 106 can both interface directly with the bearer channel 128, two bearer channels 128 may be provided so that the voice recognition controller 110 and the telephone station controller 106 can both communicate through the two bearer channels 128 at the same time.

The telephone station controller 106 and the voice recognition controller 110 operate concurrently. However, if only one bearer channel 128 is available, then the telephone station controller 106 and the voice recognition controller 110 cannot both communicate through the single bearer channel 128. Thus, having two bearer channels 128 allows both the telephone station controller 106 and the voice recognition controller 110 to simultaneously communicate through the two bearer channels 128.

The voice recognition controller 110 and a post call directory entry device 300 interface with a user at the telephone station 100 through user interfaces such as a microphone 114, a speaker 116, a keypad 118, a display device 120, and soft keys 122. These user interfaces are coupled to the signal line 132 and are accessible by other telephone station elements such as the telephone station controller 106. The microphone 114 and the speaker 116 are connected to the signal line 132 through two CODEC (coder decoder) units 124 and 126, respectively.

If the post call directory entry device 300 requires information to be entered by the user, the post call directory entry device 300 speaks through the speaker 116 to inform the user of the required information. The post call directory entry device 300 may also request additional information from the user by displaying a request on the display device 120 in addition to speaking through the speaker 116. The user responds through the keypad 118 to enter the required data or simply talk to the post call directory entry device 300 through the microphone 114.

The post call directory entry device 300 also uses the display device 120 to indicate choices that the user may select. When options are displayed on the display device 120, the locations of the options are placed in a corresponding relationship with the soft keys 122. The user selects the displayed option by pushing a corresponding soft key 122.

Figure 3:
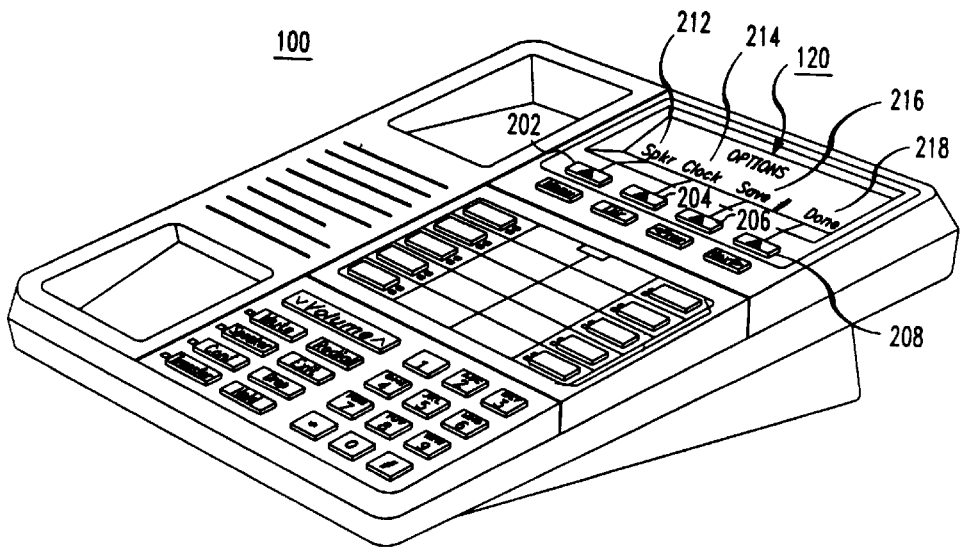
FIG. 3 is a diagram of soft keys.

FIG. 3 shows the display device 120 that has option display areas 212, 214, 216 and 218. Soft keys 202, 204, 206 and 208 are located close to the corresponding option selections displayed on the display device 120. The user selects the displayed option by simply pushing the corresponding soft key 202–208.

Figure 4:
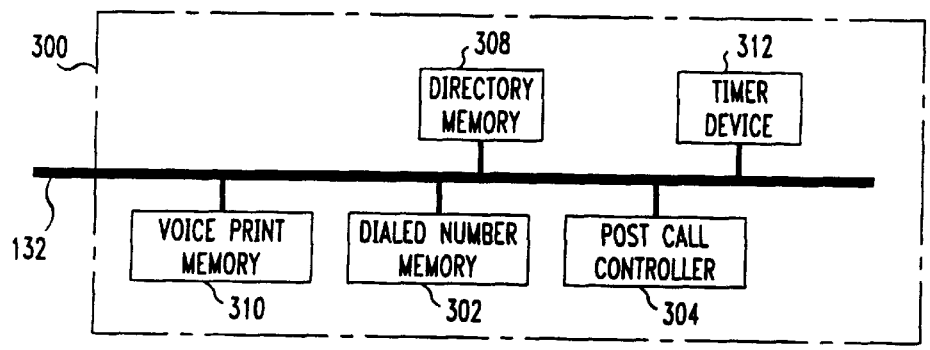
FIG. 4 is a block diagram of the post call directory entry device.

FIG. 2 shows that the post call directory entry device 300 is connected to the signal line 132. FIG. 4 shows the post call directory entry device 300 in greater detail. The post call directory entry device 300 includes a directory memory 308, a dialed number memory 302 and a post call controller 304. The post call controller 304 controls the dialed number memory 302, communicates with the voice recognition controller 110 through the signal line 132, receives information from the keypad 118 and the soft keys 122, and displays information to the user on the display device 120.

The post call controller 304 senses when the telephone station 100 is off-hook. When the telephone station 100 is off-hook, the post call controller 304 determines whether the dialpad portion of the keypad 118 are pushed. The dialpad portion is used to enter a remote number of the remote telephone station 101 to be called. If the dialpad portion of the keypad 118 is not pushed, the post call controller 304 determines whether a calling number ID is available. The calling number ID is the remote number of the remote telephone station 101 used by a remote caller and may be available when the telephone station 100 is called by the remote caller.

If the calling number ID is available or the dialpad portion of the keypad is pushed, the post call controller 304 searches the directory memory 308 to determine if the remote number is already stored in the directory memory 308. If the remote number is found in the directory memory 308 the post call controller 304 ends the post call directory entry process. If the remote number is not found, the post call controller 304 saves the remote number of the remote telephone station 101 into the dialed number memory 302 and then waits until the telephone station 100 is on-hook.

The telephone number in the calling number ID does not include any access codes that may be needed to access a public or private network required to call the remote caller. Thus the number saved in the dialed number memory 302 is only the telephone number. However, when the user desires to dial the remote number to call the remote party at a later time, needed access codes are not available. Thus, the user must initialize the post call controller beforehand with any needed access codes to be added as a prefix to the telephone number before storing the remote number in the directory memory 308.

Whether access codes are needed may be determined by several methods. For example, access codes are needed only for external numbers since access codes are unnecessary for dialing internal numbers. The remote number is an internal number if the number of digits in the remote number is less than a fixed number such as seven. External numbers have a number of digits equal to or greater than the fixed number. Thus, the need for access codes can be simply determined by counting the number of digits in the remote number.

When the post call controller 304 determines that an access code is required, the access code may be stored either in a separate field in a directory entry of the directory memory 308 or as a prefix to the remote number. When the remote number is recalled from the directory memory 308 and an access code is saved in a separate field, the access number is recalled with the remote number and used as a prefix to the remote number for dialing the remote number. When the remote number is stored in a key memory corresponding to a speed dial key and an access code is required, the access code is added as a prefix to the remote number before storing into the key memory.

If the calling number ID is not available and the user has not pushed a key of the dialpad portion of the keypad 118, then the post call controller 304 clears the dialed number memory and displays the appropriate message corresponding to the keys of the keypad 118 pushed by the user and returns to other telephone station tasks until the telephone station 100 becomes off-hook again. If the dialpad portion of the keypad 118 is pushed, the post call controller 304 saves the dialed number in the dialed number memory and then waits until the telephone station 100 becomes on-hook.

When the telephone station 100 is on-hook and a remote number is saved in the dial number memory 302, the post call controller 304 determines whether the directory memory 308 is full. When voice prints are saved, the directory memory 308 is full if there is not enough free memory in the directory memory 308 to store a directory entry having at least a preset amount of, voice print data. The directory memory 308 is full if there is insufficient free memory to store an additional voice print of a predetermined duration. For example, a predetermined duration may be 2 seconds. When information other than voice prints is saved, the directory memory 308 is full when there is insufficient free memory to store a single directory entry. If the directory memory 308 is full, the post call controller 304 clears the dialed number memory 302 and displays an idle telephone station 100 display on the display device 120.

If the directory memory 308 is not full, the post call controller 304 sets a timeout value into the timer device 312 and starts the timer. Then, the post call controller 304 queries the user whether to save the remote number. The post call controller 304 displays options on the display device 120 or outputs a message to the user through the speaker 116. For example, the post call controller may display "save #" in the display area 216 corresponding to the soft key 206. The post call controller 304 may also speak "save the number?" through the speaker 116.

The user may respond to the save request by issuing a save command. The user issues the save command by pushing one of the soft keys 122, by pushing a speed dial key of the keypad 118 or by speaking a save voice command. When the speed dial key is pushed, the remote number is stored in the corresponding key memory for speed-dialing the remote number.

When the user issues a save command by one of the above methods, the post call controller 304 saves the remote number from the dialed number memory 302 into either the directory memory 308 or in the key memory corresponding to the speed dial key. The post call controller 304 waits for the user to issue a save command until the telephone station 100 becomes off-hook. When the telephone station becomes off-hook, the post call controller 304 clears the dialed number memory 302 and displays the appropriate message reflecting the telephone station's condition on the display device 120 and ends the post call directory entry process.

If the user fails to issue a save command and the timer device 312 expires by reaching the timeout value, then the post call controller 304 changes the display on the display device 120 reflecting the telephone station's condition and ends the post call directory entry process.

When the post call controller 304 saves the remote number from the dialed number memory 302 into the directory memory 308, it first requests the user to enter a name to be associated with the remote number. The user enters the name by using the keypad 118 or speaking the name. When the user speaks the name into the microphone 114, the post call controller 304 saves a voice print generated by the microphone 114 based on the user's voice as the name to be associated with the remote number in the dialed number memory 302.

The post call controller 304 may save the voice print generated by the microphone 114 directly into the directory memory 308 without further verification. If verification is needed, the post call controller 304 requests the user to speak the name twice to generate two voice prints and compares the two voice prints with each other. When the two voice prints match each other, the remote number is saved in the dialed number memory 302.

The post call controller 304 saves the first voice print in the voice print memory 310. Then, the post call controller 304 requests the user to speak the name again and compares the second voice print with the saved first voice print. If the first and second voice prints match, the post call controller 304 stores the voice print in the directory memory 308 associated with the remote number in the dialed number memory 302.

However, if the first and second voice prints do not match, the post call controller 304 requests the user to speak the name again generating another voice print. The new voice print is compared with the voice print in the voice print memory 310 to determine if there is a match. This process continues until the post call controller 304 is able to match two voice prints or until the user decides to stop repeating the name and end the post call directory entry process.

The post call controller 304 sets the timer device 312 to a timeout value after each request for the user to speak the name. If the user fails to speak the name before the timer device 312 expires by reaching the timeout value, the post call controller 304 increments a counter value and determines whether the counter value exceeded a preset value. If the preset value is not exceeds, the post call controller 304 outputs a message to the user and then requests the user to enter the name. If the counter value exceeds the preset value, the post call controller 304 ends the post call directory entry process.

If the user issues a cancel command using the keypad 118, a soft key 122 or speaks a cancel command, the post call controller 304 responds by ending the post call directory entry process. The timer device 312 is also reset if the first and second voice prints mismatch and the post call controller 304 requests the user to repeat the name.

Figure 5A:
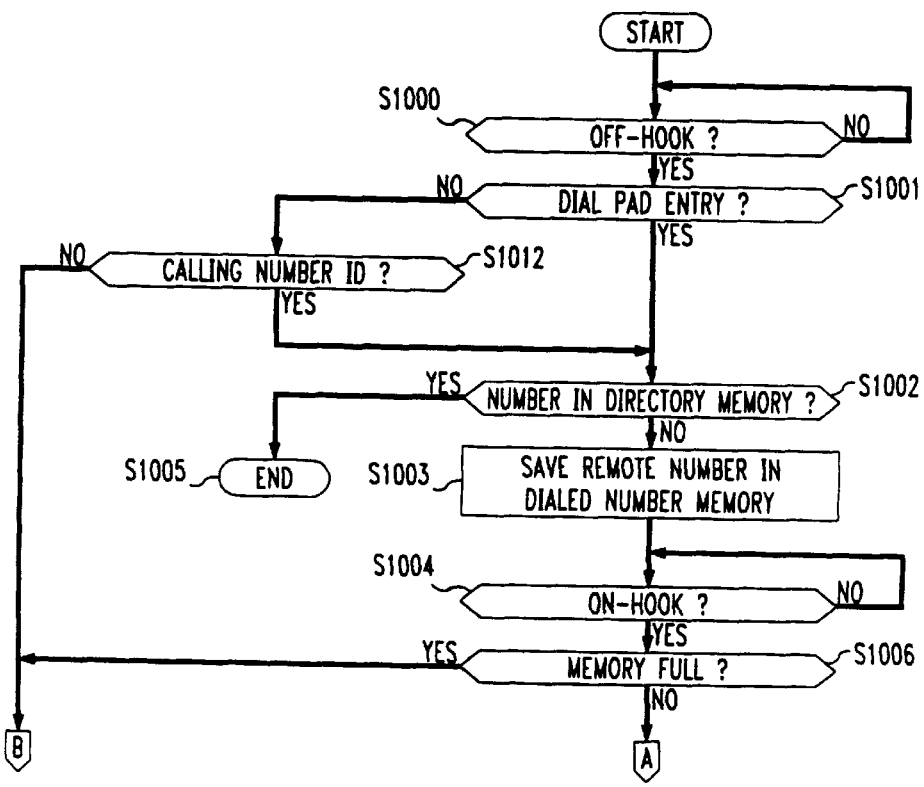
FIG. 5A and 5B is a flowchart of the post call directory entry process.
Figure 5B:
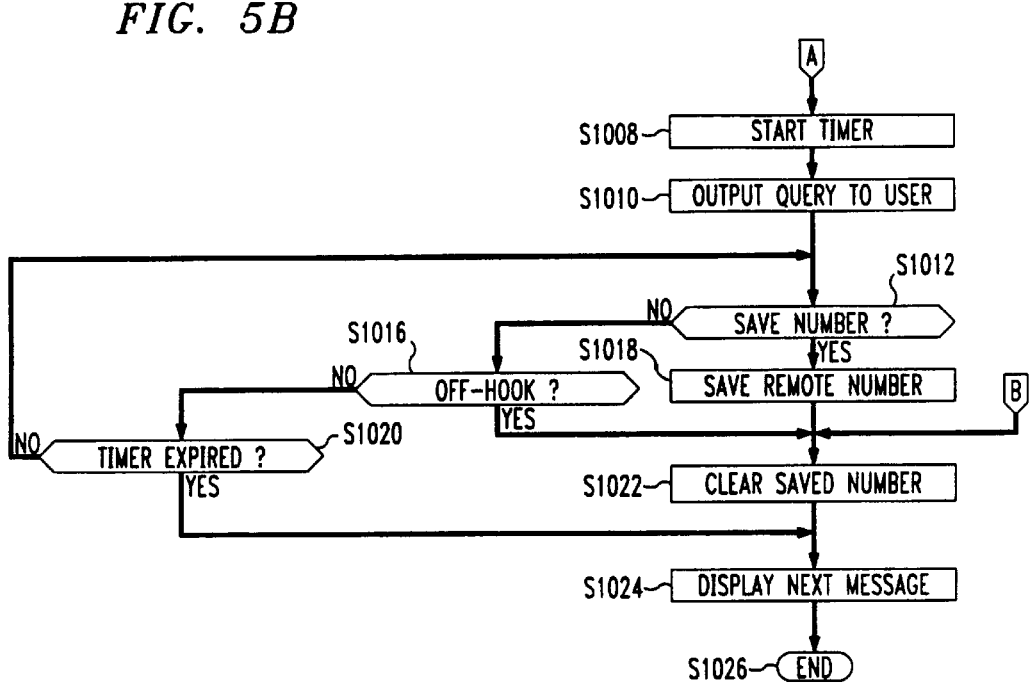

FIG. 5A and 5B is a flowchart of the post call directory entry process. In step S1000, the post call controller 304 determines whether the telephone station 100 is off-hook. If the telephone station 100 is not off-hook, the post call controller 304 re-enters step S1000 and continues to determine whether the telephone station 100 is off-hook. When the telephone station 100 becomes off-hook, the post call controller 304 goes to step S1001.

In step S1001, the post call controller 304 determines whether the dialpad portion of keypad 118 is pushed. If the dialpad portion of the keypad 118 is not pushed, the post call controller 304 goes to step S1012. Otherwise, the post call controller 304 goes to step S1002. In step S1012, the post call controller 304 determines whether a calling number ID is available. If a calling number ID is available, the post call controller 304 goes to step S1002. Otherwise, the post call controller 304 goes to step S1022.

In step 1002, the post call controller 304 searches the directory memory 308 to determine if the remote number is already in the directory memory 308. If the remote number is in the directory memory 308, then the post call controller 304 goes to step S1005 and ends the post call directory entry process. Otherwise, the post call controller 304 goes to step S1003.

In step S1003, the post call controller 304 saves the remote number in the dialed number memory 302. Then, the post call controller 304 goes to step S1004. In step S1004, the post call controller 304 detects whether the telephone station 100 is on-hook. The post call controller 304 will remain in step S1004 as long as the telephone station 100 is off-hook. When the telephone station 100 becomes on-hook, the post call controller 304 goes to step S1006.

In step S1006, the post call controller 304 determines whether the directory memory 308 is full. If the directory memory 308 is full, the post call controller 308 goes to step S1022. Otherwise, the post call controller 304 goes to step S1008.

In step S1008, the post call controller 304 sets a preset value into the timer device 312 and starts the timer device 312. Then, the post call controller 304 goes to step S1010. In step S1010, the post call controller 304 queries whether the user desires to save the remote number and goes to step S1012. The user responds to the query by either issuing a save command or by ignoring the query.

In step S1012, the post call controller 304 determines whether the user has issued a save command. The user issues the save command by pushing a soft key 122 corresponding to the save number option displayed on the display device 120, by speaking the save command or by pushing a speed dial key of the keypad 118 having a key memory. If the user issues the save command, the post call controller 304 goes to step S1018. Otherwise, the post call controller 304 goes to step S1016.

In step S1016, the post call controller 304 determines whether the telephone station 100 is off-hook. If the telephone station 100 is off-hook, the post call controller 304 goes to step S1022. Otherwise, the post call controller 304 goes to step S1020. In step S1020, the post call controller determines whether the timer device 312 has expired by reaching the timeout value. If the timer device 312 has expired, the post call controller 304 goes to step S1024. Otherwise, the post call controller 304 returns to step S1012.

In step S1018, the post call controller 304 saves the remote number in the key memory or the directory memory 308 and then goes to step S1022. In step S1022, the post call controller 304 clears the dialed number memory 302 and then goes to step S1024. In step S1024, the post call controller 304 displays the appropriate message for an idle telephone station 100 and then goes to step S1026 and ends the post call directory entry process.

Figure 6:
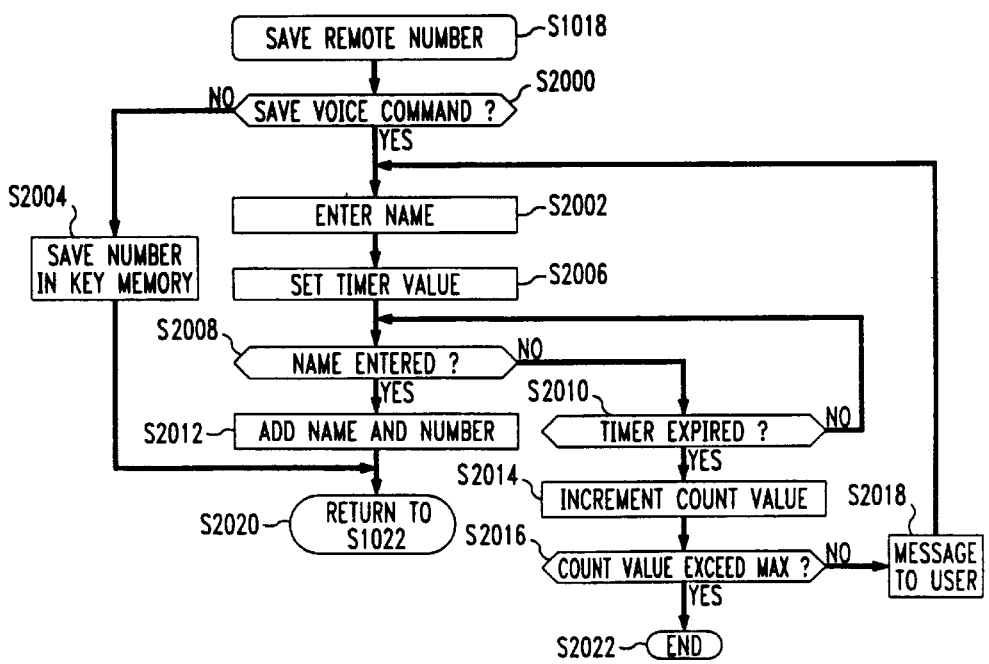
FIG. 6 is a flowchart of the save remote number process.

FIG. 6 shows the save remote number step S1018 in greater detail. In step S2000, the post call controller 304 determines whether the user issued the save command by pushing the key of the keypad 118 having the key memory. If the user issued the save command by pushing the key having the key memory, the post call controller 304 goes to step S2004. Otherwise, the post call controller 304 goes to step S2002. In step S2004, the post call controller 304 stores the remote number in the key memory and goes to step S2020 which returns to step S1022.

In step S2002, the post call controller 304 requests the user to enter a name to be associated with the remote number in the dialed number memory 302 and then goes to step S2006. In step S2006, the post call controller 304 sets a timeout value in the timer device 312 and start the timer device 312. Then, the post call controller 304 goes to step S2008.

In step S2008, the post call controller 304 determines whether a name was entered by the user. If a name was not entered by the user, the post call controller 304 goes to step S2010. Otherwise, the post call controller 304 goes to step S2012. In step S2010, the post call controller 304 determines whether the timer device 312 expired. If the timer device 312 expired, the post call controller 304 goes to step S2014. Otherwise, the post call controller 304 returns to step S2008.

In step S2014, the post call controller 304 increments a counter value and goes to step S2016. In step S2016, the post call controller 304 checks if the counter value exceeded a preset value. If the counter value exceeded the preset value, the post call controller 304 goes to step S2022 and ends the post call directory entry process, Otherwise, the post call controller 304 goes to step S2018. In step S2018, the post call controller 304 outputs a message to the user and returns to step S2002.

In step S2012, the post call controller 304 saves in the directory memory 308 both the name entered by the user in step S2002 and the remote number in the dialed number memory 302. Then, the post call controller 304 goes to step S2020 which returns to the step S1022.

The post call directory entry device 300 may be embodied in hardware using dedicated components to implement the timer device 312, the voice print memory 310, the directory memory 308 and the post call controller 304. Application specific integrated circuits (ASIC) may also be used for each of the components listed above. Portions of each component may be combined into different ASICs for optimum performance characteristics.

If the voice recognition controller 110 is a high powered processor such as a digital signal processor (DSP), the complete post call directory entry device 300 may be implemented as a program executed by the voice recognition controller 110. Alternately, the telephone station controller 106 in conjunction with the controller memory 108 may also implement the post call directory entry device functions.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A call directory entry device for a telephone station, comprising:
    a memory;
    a user interface device; and
    a post call controller that saves a remote number in a first portion of the memory when the telephone station is off-hook, the post call controller outputting a save request through the user interface device after the telephone station becomes on-hook and storing the remote number in a second portion of the memory in response to a user responding to the save request through the user interface device;
    wherein the remote number is a number of a remote caller telephone station.

2. The device of claim 1, wherein the memory includes a dialed number memory and the post call controller saves the remote number in the dialed number memory.

3. The device of claim 2, wherein:
    the user interface device includes a keypad; and
    the post call controller clears the dialed number. memory and ends the post call directory entry function if either the number of the remote caller telephone station is not available or the user pushes a key of the keypad, the key being distinct from a dialed portion of the keypad.

4. The device of claim 1, wherein the user interface device includes a display device, a keypad, soft keys, a speaker and a microphone, the post call controller outputting the save request by at least one of displaying a display of the save request on the display device and speaking the save request through the speaker, the post call controller receiving a user response through the user interface device after the telephone station becomes on-hook, the user responding by one of speaking a save command into the microphone, pushing one of the soft keys corresponding to the displayed save request and pushing a key of the keypad.

5. The device of claim 4, wherein after outputting the save request, the post call controller clears the remote number stored in memory if the telephone station goes off-hook before the user responds to the save request.

6. The device of claim 4, further comprising:
    a timer device, wherein after outputting the save request, the post call controller sets the timer device to expire after a timeout value is reached and ends the post call directory entry function if the timer device expires before the user responds to the save request, the post call controller displaying a second display after ending the post call directory entry function.

7. The device of claim 6, wherein the memory, the post call controller and the timer device are one of embodied using hardware units and embodied as programs executed in a processor.

8. The device of claim 4, wherein the memory includes a key memory corresponding to the key of the keypad and if the user responds to the save request by pushing the key of the keypad, the post call controller stores the remote number in the key memory corresponding to the key.

9. The device of claim 8, wherein the post call controller stores an access code as a prefix to the remote number in the key memory.

10. The device of claim 4, wherein the memory includes a directory memory and if the user responds to the save request by at least one of pushing the soft keys, pushing the key of the keypad and speaking a save command, the post call controller prompts the user for a name and associates the remote number with the name, the post call controller storing the remote number and the name in a directory entry of the directory memory.

11. The device of claim 10, wherein the post call controller stores an access code in the directory memory one of as a prefix to the remote number and in a field of the directory entry containing the remote number.

12. A method for storing an entry in a memory of a telephone station comprising:
    saving a remote number in a first portion of the memory when the telephone station is off-hook;

outputting a save request to a user through a user interface device after the telephone station becomes on-hook; and storing the remote number in a second portion of the memory in response to the user responding to the save request;

wherein the remote number is a number of a remote caller telephone station.

13. The method of claim 12, wherein the memory includes a dialed number memory and the post call controller saves the remote number in the dialed number memory.

14. The method of claim 13, further comprising:

clearing the dialed number memory; and ending the post call directory entry function if one of the number of the remote caller telephone station is not available and the user pushes a key of a keypad of the user interface device that is not part of a dialpad portion of keypad.

15. The method of claim 12, wherein the step of outputting the save request comprises at least one of:

displaying a display of the save request on a display device; and speaking the save request through a speaker; and wherein the step of storing the remote number comprises receiving a user response through a user interface device after the telephone station becomes on-hook, the user response comprising one of speaking a save command into a microphone, pushing one of a plurality of soft keys corresponding to the displayed save request and pushing a key of a keypad.

16. The method of claim 15, further comprising:

setting a timeout value in a timer device;

canceling the storing step when the timer device reaches the timeout value before one of the user responding to the save request and the telephone station becoming off-hook; and displaying a second display after canceling the storing step.

17. The method of claim 15, wherein the memory includes a key memory corresponding to the key of the keypad and if the user responds to the save request by pushing the key of the keypad, a post call controller stores the remote number in the key memory corresponding to the key.

18. The method of claim 15, wherein the second portion of the memory includes a directory memory and wherein the step of storing the remote number comprises, after the user responds to the save request by one of pushing the soft keys and speaking a save command:

prompting the user for a name;

associating the remote number with the name; and storing the remote number and the name in a directory entry of the directory memory.

* * * * *